United States Patent
Kamp

(10) Patent No.: US 9,789,425 B2
(45) Date of Patent: Oct. 17, 2017

(54) FILTER DEVICE AND METHOD OF CLEANING A FILTER ELEMENT

(71) Applicant: N.V. PWN WATERLEIDINGBEDRIJF NOORD-HOLLAND, Velserbroek (NL)

(72) Inventor: Petrus Cornelis Kamp, Egmond aan de Hoef (NL)

(73) Assignee: N.V. PWN WATERLEIDINGBEDRIJF NOORD-HOLLAND, Velserbroek (NL)

( * ) Notice: Subject to any disclaimer, the term of this patent is extended or adjusted under 35 U.S.C. 154(b) by 245 days.

(21) Appl. No.: 14/653,146

(22) PCT Filed: Dec. 18, 2013

(86) PCT No.: PCT/NL2013/050911
§ 371 (c)(1),
(2) Date: Jun. 17, 2015

(87) PCT Pub. No.: WO2014/098582
PCT Pub. Date: Jun. 26, 2014

(65) Prior Publication Data
US 2015/0343342 A1     Dec. 3, 2015

(30) Foreign Application Priority Data

Dec. 18, 2012  (NL) ...................................... 2010002

(51) Int. Cl.
*B01D 29/60*  (2006.01)
*B01D 29/66*  (2006.01)
(Continued)

(52) U.S. Cl.
CPC ............. *B01D 29/66* (2013.01); *B01D 29/52* (2013.01); *B01D 29/606* (2013.01); *B01D 37/046* (2013.01); *B01D 2201/085* (2013.01)

(58) Field of Classification Search
CPC .. C02F 29/0075; C02F 29/0079; C02F 29/52; C02F 29/66; C02F 29/661; C02F 29/605;
(Continued)

(56) References Cited

U.S. PATENT DOCUMENTS

| 3,637,079 A | | 1/1972 | Strub |
| 5,218,986 A | * | 6/1993 | Farwell ..................... E03B 3/08 |
| | | | 137/14 |

(Continued)

FOREIGN PATENT DOCUMENTS

| DE | 1967210 C2 * 12/1981 ................ C02F 1/78 |
| WO | 03/020397 A1  3/2003 |

OTHER PUBLICATIONS

International Search Report, dated Mar. 7, 2014, from corresponding PCT application.

*Primary Examiner* — Matthew O Savage
(74) *Attorney, Agent, or Firm* — Young & Thompson

(57) ABSTRACT

A filter device includes a filter vessel with a fluid inlet for unfiltered liquid, a filter element in the filter vessel with a filter inlet communicating with the vessel and with a filter outlet, the filter outlet communicating via a cleaning duct and a cleaning valve with a cleaning device, the cleaning device including a cleaning chamber including a volume $V0$ of cleaning fluid and a pressure chamber at a starting pressure $P0$, communicating with the cleaning chamber for supplying cleaning fluid to the filter outlet, via the cleaning duct, a fluid supply line connected via a pump to the cleaning chamber for supplying a volume $Vr$ of cleaning fluid to the cleaning chamber while the cleaning chamber is in open fluid connection with the pressure chamber and the cleaning
(Continued)

valve is closed so that the pressure in the pressure chamber rises to at or about the starting pressure P0.

18 Claims, 1 Drawing Sheet

(51) Int. Cl.
  *B01D 37/04* (2006.01)
  *B01D 29/52* (2006.01)
(58) Field of Classification Search
  CPC .... C02F 29/606; C02F 37/045; C02F 37/046; C02F 65/02; C02F 65/08; C02F 2201/085
  USPC ............ 210/411, 416.1, 416.3, 798; 137/209
  See application file for complete search history.

(56) References Cited

U.S. PATENT DOCUMENTS

| | | |
|---|---|---|
| 5,281,344 A | 1/1994 | Miller et al. |
| 6,562,246 B2 * | 5/2003 | McGowan ........... B01D 29/114 210/108 |

* cited by examiner

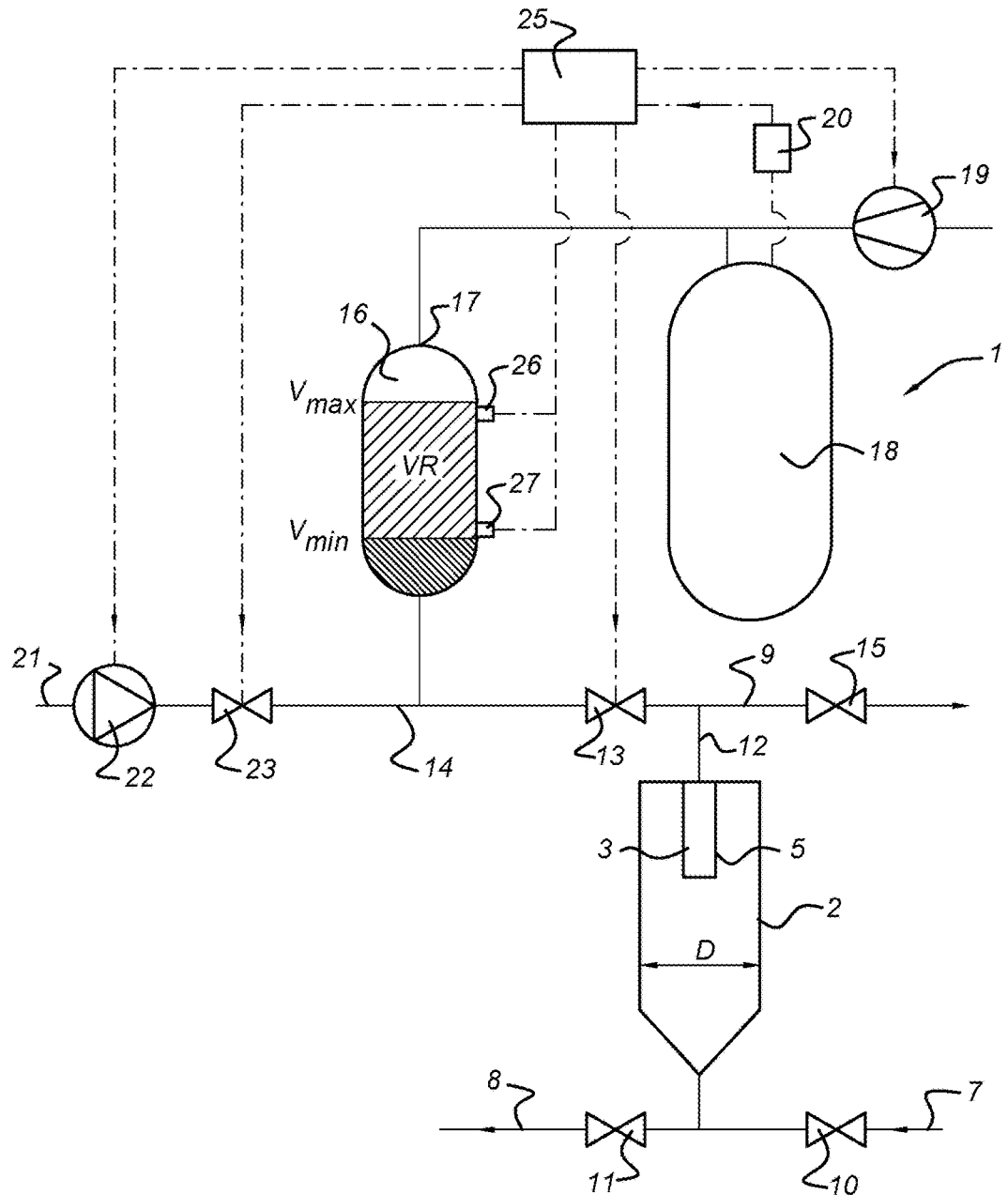

FILTER DEVICE AND METHOD OF CLEANING A FILTER ELEMENT

FIELD OF THE INVENTION

The invention relates to a filter device comprising a filter vessel with a fluid inlet for unfiltered liquid, a filter element in the filter vessel with a filter inlet that is in fluid communication with the vessel and with a filter outlet, the filter outlet being via a cleaning duct and a cleaning valve in fluid connection with a cleaning device, the cleaning device comprising a cleaning fluid chamber comprising a volume V0 of cleaning fluid and a pressure chamber, in fluid connection with the cleaning fluid chamber, a gas supply member connected to the pressure chamber, for supplying a volume Vr of cleaning fluid at a starting pressure P0 from the cleaning fluid chamber to the filter outlet via the cleaning duct.

The invention also relates to a method of cleaning a filter element.

BACKGROUND OF THE INVENTION

Such a filter device is known from U.S. Pat. No. 3,637,079. In this publication a filter device comprising multiple filter candles, vertically suspended from a wall plate in a funnel-shaped tank are shown, for filtering fluids that are supplied to a lower side of the tank. The outflow side of the filter candles can for cleaning be flushed in reverse flow with water with bacterial or cleansing additions, from a container that is connected via a feed pipe and a shutoff valve to the outflow side of the filter candles. A compressed air unit is connected to the container to pressurize the cleaning fluid. The volume occupied by the cleaning fluid is less than half the total volume of the container. Upon flushing of the filter candles, the pressure in the pressure vessel drops to about 3.5 bar. After the cleaning fluid has, upon opening of the shutoff valve, has flowed into the filter candles and has formed a film of fluid on the inner walls of the filter candles, the compressed air from the container passes into the filter candles. The sludge attached to the outside of the filter candles is thereby loosened and slides away into the funnel-shaped base of the tank. The known filter device has as a disadvantage that the compressed air unit requires a relatively large amount of energy. Furthermore, after a cleaning operation, it will take a relatively long time pressurizing the cleaning fluid container after its refilling.

Another filter device is described in WO 03/020397. In this document a filter backflushing system is described including an accumulator containing a pressurised bladder which propels a supply of backwash fluid contained within the accumulator in a reverse direction a filter element. The volume of backwash fluid that is displaced by the bladder will be relatively small, such as several liters, as reliable membranes that can displace fluids at high pressures are of relatively small-size. Furthermore, the use of a flexible bladder will lead to a limited operating life and to susceptibility of the system to failure or leakage.

It is therefore an object of the invention to provide a filter device and method of cleaning such a filter device, which effectively transports large volumes of cleaning fluids through a filter at increased pressure, requiring relatively little energy. It is a further object of the invention to provide a filter device and method of cleaning, which filter device can be rapidly brought into the operational state after a cleaning operation.

SUMMARY OF THE INVENTION

Hereto in a filter device according to the invention:
the volume Vr is smaller than the volume V0 such that a volume of cleaning fluid remains in the cleaning fluid chamber (16),
a cleaning fluid supply line (21) being connected via a supply pump (22) to the cleaning fluid chamber (16) for supplying a the volume Vr of cleaning fluid to the cleaning fluid chamber (16) while the cleaning fluid chamber (16) is in open fluid connection with the pressure chamber (18) and the cleaning valve (13) is closed so that the pressure in the pressure chamber (18) rises to at or about the starting pressure P0.

By not completely emptying the fluid chamber and by using the refilling operation of the fluid supply pump to re-pressurize the gas in the gas supply chamber, the gas supply chamber is rapidly brought back into its operational state after use. In view of the high efficiency of liquid pumps, compared to compressors, pressurisation of the gas supply chamber via the fluid supply pump is utilising relatively little energy and is very effective.

Because the cleaning fluid supply chamber is sealed by the remaining cleaning fluid that prevents the pressurising gas from escaping, no membranes need to be used and large volumes of cleaning fluid, such as several thousands of liters, can be displaced. The absence of a membrane for providing a sealing mechanism in the fluid supply chamber results in improved reliability and increased operational life.

In an embodiment, a gas supply member is connected to the pressure chamber. The gas supply member, such as a compressor, is utilised to before first time use pressurize the gas supply chamber to an initial pressure P0, and to re-supply small amounts or air that are lost during repetitious operation.

In one embodiment, the filter device comprises:
a control unit connected to the cleaning valve and adapted for opening the cleaning valve for supplying a volume Vr of pressurized cleaning fluid from the cleaning fluid chamber to the filter element and for closing of the cleaning valve, and
a pressure detector connected to the pressure chamber for measuring a pressure chamber pressure, and connected with an output to the control unit, wherein the control unit is connected to the gas supply member for activating the gas supply member when the difference between the pressure measured by the pressure detector and the starting pressure P0 is larger than a predetermined threshold pressure Pt, until the pressure in pressure chamber is at least about equal to the starting pressure P0.

By not completely emptying the cleaning fluid chamber, the pressurizing gas, for instance air, does not leave the cleaning fluid chamber but is contained in the cleaning fluid chamber and the pressure chamber, and acts as a "gas spring". During emptying, the pressure drops from P0, typically by between 10% and 20%, wherein P0 can amount to for instance 5 bar, and the end pressure P1 may be about 4.5 bar.

The gas supply member, or compressor, can be of relatively small capacity and is only used for initially filling the pressure chamber at start-up of the filtering operations and is used intermittently during cleaning for supplementing lost pressurizing gas, which may for instance partly dissolve in the cleaning fluid. Pressurization of the pressurizing chamber after cleaning, takes place for the largest part by pumping new cleaning fluid back into the cleaning fluid chamber.

Operation of the fluid pump is relatively quick and effective in comparison to using a compressor for pressuring the pressure vessel. According to the invention, the gas supply member—or compressor—is only used during a limited amount of time. Hence the system is very energy effective and is after a cleaning step rapidly brought back into its operational state.

When the control unit opens the valve, a large volume, such as for instance several thousands of liters per second, can flow from the cleaning fluid chamber to the filter in reverse flow, such that contaminants are effectively removed from the filter. After cleaning, the supply pump refills the cleaning fluid chamber with a volume Vr of cleaning fluid, until the pressure rises to about P0. When the pressure detector detects that the pressure in the pressure chamber does not rise sufficiently close to P0, the control unit activates the gas supply member until the pressure rises to be equal, or about equal to P0.

In an embodiment, the supply pump is connected to the cleaning fluid chamber via a supply valve, the pump and the supply valve being connected to the control unit for being activated to supply a volume Vr of cleaning fluid to the cleaning fluid chamber following a cleaning operation for a completely automated cleaning cycle.

The pressure chamber may be situated in a separate pressure vessel, that is with an outlet connected to a pressure inlet of the cleaning fluid chamber, the cleaning fluid chamber being situated in a cleaning fluid vessel. In this manner a single pressure vessel may be connected to multiple filter vessels. The pressure vessel may have a volume Vp that is at least 2 times the total volume V0 of the cleaning fluid chambers that are connected to the pressure chamber.

In a preferred embodiment, the length of the cleaning duct is not more than ten times a transverse diameter of the filter vessel. By placing the cleaning fluid chamber in close proximity to the filter vessel, it is prevented that upon a cleaning operation, the large volume of cleaning fluid supplied to the filer element causes a shockwave, or water hammer, which may lead to damage to the valve when it is closed after cleaning.

In a filter device according to the invention, typically $200*25\ m^2=5000\ m^2$ of filter surface is present. This filter surface is cleaned by a flow of cleaning fluid of between 2-5 L/m$^2$, typically 3 L/m$^2$. The diameter of the cleaning duct, the starting pressure P0 and the volume of the pressure chamber Vp are adapted to supply within 3-10 seconds second a volume of cleaning fluid of about 15.000 L to the filter surface so that the filter fluid is supplied at a rate of between 1500 L/s and 5000 L/s.

BRIEF DESCRIPTION OF THE DRAWINGS

An embodiment of the filter device according to the invention will be explained in detail with reference to the accompanying drawing. In the drawing the sole FIGURE shows a schematic diagram of a filter device according to the invention.

DETAILED DESCRIPTION OF THE INVENTION

In the sole FIGURE, a filter device 1 is shown comprising a filter vessel 2 comprising one or more filter elements 3. The filter elements may comprise an array of ceramic filter elements or may comprise other filters such as membrane filters, hollow fiber filters or other types of filter elements. A filter inlet 5 is formed by (micro) pores in the filter surface that are in fluid communication with the interior of the filter vessel 2. The filter vessel 2 has an inlet 7 for supply of unfiltered fluid to the vessel 2 via a valve 10 and a filter outlet 12 that is connected to a filtered fluid outlet duct 9 for removal of filtered fluid via an outlet valve 15. The filter vessel 2 has a cleaning fluid outlet duct 8 for removal of cleaning fluid from the vessel 2 via a valve 11.

The filter outlet 12 is via a cleaning valve 13 and a cleaning duct 14 connected to a cleaning fluid vessel 16. The cleaning fluid vessel 16 is provided with two level sensors 26,27 that are connected to a controller 25. A gas inlet 17 of the cleaning fluid vessel 16 is connected to a pressure vessel 18, that is connected to a gas supply device 19, which may comprise a compressor. A pressure sensor 20 is connected to the interior of the pressure vessel 18. A fluid inlet of the cleaning fluid vessel 16 is via a cleaning valve 23, and cleaning fluid supply line 21 connected to a cleaning fluid pump 22. The pump 22, valves 13,23 and the compressor 19 are controlled by the controller 25, that may comprise a programmable logic computer, a PC or other electronic control device. The pressure sensor 20 is connected with an output to the controller 25.

Fluid that is to be filtered, such as raw water for drinking water preparation, or industrial waste water, is fed via the inlet 7 and opened valve 10 into the filter vessel 2, while the valve 11 is closed. The fluid to be filtered passes from the vessel 2 into the filter element 3, and filtered fluid leaves the filter vessel 2 via the filter outlet 12, through the outlet duct 9, while the valve 15 is opened and valve 13 is closed.

When the filter elements 3 become contaminated during operation, a rinsing cycle is started by closing the valve 15 and opening of the valve 13. Due to the initial air pressure P0 in the cleaning fluid vessel 16, which may for instance be about 5, the cleaning fluid is transported from the vessel 16 via the filter outlet 12 and the filter element 3 into the filter vessel 12. The valve 11 is opened so that the cleaning fluid, and particles removed from the filter by the high-pressure cleaning fluid, are removed via the cleaning fluid outlet duct 8. During the cleaning, the level detector 27 observes the lower level in the vessel 16 and signals to the control unit 25 to close the valve 13 when Vr liters of cleaning fluid have been supplied from the vessel 16 to the filter vessel 2, i.e. when the cleaning fluid level in the cleaning fluid vessel 16 has dropped from Vmax to Vmin. During the cleaning cycle, the pressure in the pressure vessel 18 drops from P0 by for instance 0.5 bar to Pmin which may be about 4.5 bar. In case more cleaning fluid vessels are connected to a single pressure vessel, the volume of the pressure vessel needs to increase in proportion to the number of cleaning fluid vessels. V0-Vr liters of cleaning fluid remain in the cleaning vessel 1. The pressure drop in pressure vessel 18 is due to the increase in available volume Vr of the fluid vessel 16 as fluid is removed therefrom, without pressurizing gas, for instance compressed air, being lost.

Upon completion of a cleaning step, the valve 23 is opened, valve 13 is closed, and the pump 22 is activated by the controller 25, such that a volume Vr of cleaning fluid is reintroduced into the vessel 16 by the cleaning fluid pump 22. During refilling of cleaning vessel 16, the pressure in the pressure vessel 18 increases to P0.

The pressure sensor 20 measures the pressure inside the pressure vessel 18 upon completion of the refilling of the cleaning vessel 16 and feeds the signal into the controller 25. In the controller, the measured value is compared with the initial pressure value P0. If the difference of the measured pressure and P0 is larger than a threshold pressure value Pt, which may be for instance between 1% and 15% of P0, typically about 5% of P0, so for instance about 0.25 bar, the controller 25 activates the compressor 19 that feeds compressed air into the vessel 18, until the pressure is substantially equal to P0, at which moment the controller switches off the compressor 19.

In order to avoid pressure waves from originating upon opening of the cleaning valve 13, the combined length of the filter outlet duct 12, and the cleaning duct 14 extending between the outlet of the filter 12 and the cleaning fluid vessel 16, is not larger than 3 times the diameter D of the filter vessel, preferably smaller than 1.5 D, which diameter D may for instance be 1 m or larger.

The invention claimed is:

1. A filter device (1) comprising:
   a filter vessel (2) with a fluid inlet (7) for unfiltered liquid,
   a cleaning duct (14) with a cleaning valve (13),
   a cleaning device comprising i) a cleaning fluid vessel containing a cleaning fluid chamber comprising a volume V0 of cleaning fluid, and ii) a pressure vessel containing a pressure chamber at a starting pressure P0, wherein an outlet of the pressure vessel is connected to the cleaning fluid chamber via a pressure inlet of the cleaning fluid chamber such that the cleaning fluid chamber is in open fluid connection with the pressure chamber,
   a filter element (3) located in the filter vessel, the filter element (3) having a filter inlet (5) that is in fluid communication with the filter vessel and a filter outlet (12), the filter outlet being, via the cleaning duct (14) and the cleaning valve (13), in fluid connection with the cleaning device so that the cleaning fluid chamber is arranged for supplying a volume Vr of cleaning fluid, via the cleaning duct (14) and the filter outlet (12), to the filter element (3),
   a supply pump (22),
   a cleaning fluid supply line (21) connected, via the supply pump (22), to the cleaning fluid chamber for supplying the volume Vr of cleaning fluid to the cleaning fluid chamber while the cleaning fluid chamber is in open fluid connection with the pressure chamber and while the cleaning valve (13) is closed so that the pressure in the pressure chamber rises to at or about the starting pressure P0, and
   a control unit connected to the cleaning valve and adapted i) for opening the cleaning valve for supplying the volume Vr of cleaning fluid, under pressure, from the cleaning fluid chamber to the filter element (3) via the cleaning duct and the filter outlet, and ii) for closing of the cleaning valve,
   wherein the control unit is adapted to open the cleaning valve in such a manner that the volume Vr is smaller than the volume V0 such that a minimum volume Vmin of cleaning fluid remains in the cleaning fluid chamber.

2. The filter device according to claim 1, further comprising a gas supply member (19) connected to the pressure chamber.

3. The filter device according to claim 2, further comprising:
   a pressure detector (20) connected i) to the pressure chamber for measuring a pressure chamber pressure, and ii) with an output to the control unit (25),
   wherein the control unit is connected to the gas supply member (19) for activating the gas supply member when a difference between the pressure measured by the pressure detector (20) and the starting pressure P0 is larger than a predetermined threshold pressure Pt, until the pressure in pressure chamber is at least about equal to the starting pressure P0.

4. The filter device (1) according to claim 3, wherein the supply pump (22) is connected to the cleaning fluid chamber via a supply valve (23), the pump (22) and the supply valve (23) being connected to the control unit (25) for being activated to supply a volume Vr of cleaning fluid to the cleaning fluid chamber following a cleaning operation.

5. The filter device (1) according to claim 2, wherein the supply pump (22) is connected to the cleaning fluid chamber via a supply valve (23), the pump (22) and the supply valve (23) being connected to the control unit (25) for being activated to supply a volume Vr of cleaning fluid to the cleaning fluid chamber following a cleaning operation.

6. The filter device (1) according to claim 1, wherein the supply pump (22) is connected to the cleaning fluid chamber via a supply valve (23), the pump (22) and the supply valve (23) being connected to the control unit (25) for being activated to supply the volume Vr of cleaning fluid to the cleaning fluid chamber following a cleaning operation.

7. The filter device (1) according to claim 1, wherein a volume Vp of the pressure chamber is at least 2 times the volume V0.

8. The filter device (1) according to claim 1, wherein a length of the cleaning duct (14) is not more than 10 times a transverse diameter D of the filter vessel (2).

9. The filter device (1) according to claim 1, wherein a diameter of the cleaning duct (14), the starting pressure P0, and a volume Vp of the pressure chamber are adapted to supply the volume of cleaning fluid Vr to the filter element (3) at a rate of at least 500 L/s.

10. A method of cleaning a filter element (3) in the filter device (1) (1) comprising a filter vessel (2) with a fluid inlet (7) for unfiltered liquid; a cleaning duct (14) with a cleaning valve (13); a cleaning device comprising i) a cleaning fluid vessel containing a cleaning fluid chamber comprising a volume V0 of cleaning fluid, and ii) a pressure vessel containing a pressure chamber at a starting pressure P0, wherein an outlet of the pressure vessel is connected to the cleaning fluid chamber via a pressure inlet of the cleaning fluid chamber such that the cleaning fluid chamber is in open fluid connection with the pressure chamber; a filter element (3) located in the filter vessel, the filter element (3) having a filter inlet (5) that is in fluid communication with the filter vessel and a filter outlet (12), the filter outlet being, via the cleaning duct (14) and the cleaning valve (13), in fluid connection with the cleaning device so that the cleaning fluid chamber is arranged for supplying a volume Vr of cleaning fluid, via the cleaning duct (14) and the filter outlet (12), to the filter element (3); a supply pump (22); a cleaning fluid supply line (21) connected, via the supply pump (22), to the cleaning fluid chamber for supplying the volume Vr of cleaning fluid to the cleaning fluid chamber while the cleaning fluid chamber is in open fluid connection with the pressure chamber and while the cleaning valve (13) is closed so that the pressure in the pressure chamber rises to at or about the starting pressure P0; and a control unit connected to the cleaning valve and adapted i) for opening the cleaning valve for supplying the volume Vr of cleaning fluid, under pressure, from the cleaning fluid chamber to the filter element (3) via the cleaning duct and the filter outlet, and ii) for closing of the cleaning valve, wherein the control unit is adapted to open the cleaning valve in such a manner that the volume Vr is smaller than the volume V0 such that a minimum volume Vmin of cleaning fluid remains in the cleaning fluid chamber, said method comprising the steps of:

feeding the volume Vr of cleaning fluid to the filter outlet (12) of the filter element (3) from the cleaning fluid chamber containing the volume V0 of cleaning fluid, the cleaning fluid chamber being connected to the pressure chamber comprising a pressurizing fluid, at a starting pressure P0, refilling the cleaning fluid chamber with cleaning fluid to contain the volume V0 of cleaning fluid, wherein, the volume Vr is smaller than the volume V0 such that the volume Vmin of cleaning fluid remains in the cleaning fluid chamber, and after the cleaning step, the volume Vr is supplied to the cleaning fluid chamber while it is in open fluid communication with the pressure chamber so that the pressure in the pressure chamber rises towards P0.

11. The method according to claim 10, further comprising the step of measuring the pressure in the pressure chamber after the volume Vr of cleaning fluid has been reintroduced into the cleaning vessel and supplying pressurizing fluid into the pressure chamber when the difference between the measured pressure and Po is larger than a predetermined threshold value.

12. The method according to claim 11, further comprising the step of pressurizing the pressure chamber via a pressurization device (19) until the pressurizing fluid has the starting pressure P0.

13. The method according to claim 11, wherein the volume of cleaning fluid Vr is supplied at a rate of at least 500 L/s and a pressure of at least 3 bar to the outlet (12) of the filter element (3).

14. The method according to claim 10, further comprising the step of pressurizing the pressure chamber via a pressurization device until the pressurizing fluid has the starting pressure P0.

15. The method according to claim 14, wherein the volume of cleaning fluid Vr is supplied at a rate of at least 500 L/s and a pressure of at least 3 bar to the outlet (12) of the filter element (3).

16. The method according to claim 10, wherein the volume of cleaning fluid Vr is supplied at a rate of at least 500 L/s and a pressure of at least 3 bar to the outlet (12) of the filter element (3).

17. The method according to claim 10, wherein a volume Vs of pressurizing fluid supplied to the pressure chamber at a pressure of about P0 is not more than 0.5 times the volume Vp of the pressure chamber.

18. A filter device (1) comprising:
a cleaning device comprising
i) a cleaning fluid vessel containing a cleaning fluid chamber comprising a volume V0 of cleaning fluid, the cleaning fluid vessel having a pressure inlet, and
ii) a pressure vessel containing a pressure chamber at a starting pressure P0,
wherein an outlet of the pressure vessel is connected to the cleaning fluid chamber via the pressure inlet of the cleaning fluid chamber such that the cleaning fluid chamber is in open fluid connection with the pressure chamber;
a cleaning duct (14) with a first end and a second end, the second end including a cleaning valve (13), wherein at a location between the first end and the second end, the cleaning duct (14) is connected to the cleaning fluid vessel;
a filter vessel (2) with a fluid inlet (7) for connection to an unfiltered liquid source;
a filter element (3) located in the filter vessel (2), the filter element (3) having i) a filter inlet (5) that is in fluid communication with the filter vessel, and ii) a filter outlet (12),
wherein, via the second end of the cleaning duct (14) and the cleaning valve (13), the filter outlet is in fluid connection with the cleaning fluid chamber for the filter element (3) receiving a volume Vr of cleaning fluid supplied by the cleaning fluid chamber;
a supply pump (22);
a cleaning fluid supply line (21) connected, via the supply pump (22) and the first end of the cleaning duct (14), to the cleaning fluid chamber for supplying the volume Vr of cleaning fluid to the cleaning fluid chamber while the cleaning fluid chamber is in open fluid connection with the pressure chamber and while the cleaning valve (13) is closed so that the pressure in the pressure chamber rises to the starting pressure P0; and
a control unit connected to the cleaning valve and adapted
i) for opening the cleaning valve for supplying the volume Vr of cleaning fluid, under pressure, from the cleaning fluid chamber to the filter element (3) via the cleaning duct and the filter outlet, and
ii) for closing of the cleaning valve,
wherein the control unit is adapted to open the cleaning valve in such a manner that the volume Vr is smaller than the volume V0 such that a minimum volume Vmin of cleaning fluid remains in the cleaning fluid chamber.

* * * * *